United States Patent [19]

Patel

[11] 4,049,600

[45] Sept. 20, 1977

[54] WELDABLE CORROSION RESISTANT PRIMER MATERIAL

[75] Inventor: Kanti D. Patel, Plymouth, Mich.

[73] Assignee: Mortell Company, Kankakee, Ill.

[21] Appl. No.: 594,122

[22] Filed: July 8, 1975

[51] Int. Cl.² .......................... C09D 3/58; C09D 3/66; C09D 5/08

[52] U.S. Cl. ............................... 260/22 EP; 106/14; 260/22 A; 260/28 R; 260/33.6 EP; 260/33.6 R; 260/37 EP; 260/40 R

[58] Field of Search ............. 260/22 EP, 28, 33.6 EP, 260/37 EP; 106/14

[56] References Cited

U.S. PATENT DOCUMENTS

| | | | |
|---|---|---|---|
| 1,364,134 | 1/1921 | Morgan | 106/243 |
| 3,230,162 | 1/1966 | Gilchrist | 260/22 EP |
| 3,313,635 | 4/1967 | Wollek et al. | 106/14 |
| 3,520,841 | 7/1970 | Graver et al. | 260/22 EP |
| 3,876,574 | 4/1975 | Nagahisa et al. | 106/14 |
| 3,910,797 | 10/1975 | Beers | 106/14 |
| 3,920,595 | 11/1975 | Anderson et al. | 260/22 EP |
| 3,928,254 | 12/1975 | Takayama et al. | 260/40 R |
| 3,944,712 | 3/1976 | Kurcz | 106/1 |

OTHER PUBLICATIONS

Zimmerman & Lavine, Industrial Research Service's Supplement I to the 1953 Edition of Handbook of Material Trade Names, 1956, pp. 65 and 184.

*Primary Examiner*—Ronald W. Griffin
*Attorney, Agent, or Firm*—Harness, Dickey & Pierce

[57] ABSTRACT

A weldable, corrosion resistant primer material which is adapted for airless spraying application and which is resistant to mill oil and drawing compounds and is not subject to loss of properties under the influence of phosphating systems utilized in modern automobile manufacturing plants. The welding time of the material may be left open and may be varied to accommodate various assembly operations.

11 Claims, No Drawings

WELDABLE CORROSION RESISTANT PRIMER MATERIAL

BACKGROUND AND SUMMARY OF THE INVENTION

It is well known in the art to utilize the zinc-rich primer materials for providing corrosion resistant coatings on metal surfaces, such as upon the sheet metal body components of automotive vehicles. Such primer coatings utilize fine zinc particles, and in the presence of a corrosive atmosphere, the steel body components are protected at the expense of the zinc particles, since the electrical potential of the zinc is sufficiently higher than that of a steel to direct the flow of electrons to the steel, maintaining a negative charge on the steel surface and preventing the formation of ferrous ions which represent corrosion or rust. This effect results in the formation of zinc hydroxide on the zinc which in turn reacts with chlorine or carbon dioxide in the surrounding environment to form basic zinc salts. These basic zinc salts plate out on the bare steel surface to form a protective coating which affords good barrier protection to the steel. When this effect is taking place, the metallic zinc is, of course, being consumed by the salt formation; thus the term "sacrifical action".

While such sacrificial-type primer compositions have found wide commercial use, zinc-rich primer materials per se suffer a number of shortcomings over which the priming material or composition of the present invention are intended to overcome. One of the primary shortcomings of zinc-rich primers resides on the cost thereof, resulting from the high cost of the zinc embodied therein. A related problem, of course, resides in the limited availability of the zinc material embodied in such zinc-rich primers. The primer material of the present invention, on the other hand, does not utilize zinc and thus may be commercially manufactured at a cost of approximately one-half (50%) that of zinc-rich primers, and it is therefore one important object of the present invention to provide a corrosion resistant primer material which may be manufactured at a significantly lower cost of comparable zinc-rich primers.

An additional shortcoming of zinc-rich primers resides in its relatively low flash point, i.e., in the order of 80° F. which results in severe limitations as to bulk use. The primer material of the present invention has a flash point in excess of 100° F. and therefore can be used almost without limitation in bulk form.

Another significant drawback of zinc-rich primers resides in the high magnitude of weight per gallon, which is typically in the order of 22 pounds per gallon. The primer material of the present invention, on the other hand, weighs approximately 9 pounds per gallon, thereby permitting the use of significantly larger containers, with a resultant savings in container costs and ancillary shipping expenses.

Yet another extremely important drawback of primer materials heretofore known and used results in the fundamental degree of corrosion reistance provided thereby. While zinc-rich primers are capable of surviving only 250–500 hour salt spray tests commonly utilized in the automotive industry, the primer material of the present invention is capable of and has survived identical salt spray tests lasting for up to 1,000 hours. Accordingly, it is another important object of the present invention to provide an improved primer material which exhibits improved corrosion resistant properties as compared to zinc-rich primers heretofore known and used.

Still another fundamental shortcoming of zinc-rich primers resides in the fact that once the entire quantity of zinc has been consumed as a result of the sacrificial process, the corrosion resistant properties afforded by such materials is essentially terminated; however, since the primer material of the present invention does not operate on a sacrificial principle, the corosion resistant properties thereof last essentially indefinitely.

A further shortcoming of zinc-rich primers, insofar as the automotive industry is concerned, results from the phosphating process to which body parts are subjected preparatory to painting in order to remove oil films and the like. Since such phosphating processes occur after the primer material has been applied, zinc-rich primers have been found to be objectionable in that the zinc is attacked by the phosphating chemicals. Such is not the case with the primer material of the present invention since no zinc is utilized therein and thus the primer material is completely unaffected by the phosphating operations.

Still another shortcoming of zinc-rich primers of the type heretofore known and used results in the creation of stress areas on body components which are subjected to certain types of welding operations. Typically, such problems arrise in connection with the welding of hem flanges, for example, on automobile doors. In view of the fact that the corrosion resistant coating material of the present invention is entirely devoid of sacrificial material, such as zinc, no such stress areas occur and thus there is no likelihood of corrosion being created on the metal component at the areas of the welds formed therein. An additional shortcoming of zinc-rich primers resides in the aforementioned low flash point which results in objectionable burn-through areas during welding operations.

The corrosion resistant coating material of the present invention will also be found to be superior to zinc-rich coatings heretofore known and used insofar as the coverage obtained thereby. In particular, typical zinc-rich coatings provide a film on the order of 1.5 to 2 mils thickness, whereas the coating material of the present invention may be applied so as to provide a 5.0 mil thickness, thereby assuring for complete and effective coverage.

Yet additional advantages of the corrosion resistant primer material of the present invention over comparable zinc-rich primer materials will be seen from the fact that zinc-rich coatings are extremely difficult to "clean up" and frequently require the use of mechanical abrasion means during a cleaning operation. The coating material of the present invention, on the other hand, may be cleaned up merely with the use of mineral spirit solvents or the like. Further, the primer material of the present invention has been found to be exempt from O.S.H.A. Rule 66, whereas certain types of zinc-rich primer materials are subjected to O.S.H.A. statutory limitations.

Another objectionable criticism to which zinc-rich primers have been subjected resides in the fact that the equipment used to apply the same must be cleaned with a suitable solvent material on a twice-daily basis in order to maintain such equipment operating satisfactorily, and that such equipment cannot be left unattended without cleaning for any period of time without subjecting such machinery to damage. The primer material of the present invention, on the other hand, can be left for limited periods of time without requiring cleaning and only periodic cleaning of the application equipment is all that is necessary.

Zinc-rich primers have also been found to be objectionable from the standpoint that they can only be used with spotwelding operations. The primer material of the present invention, on the other hand, may be used with spotwelding equipment, as well as with resistant welding apparatus. Further, zinc-rich primers, as they are being applied, must be constantly agitated thereby requiring special agitating equipment, whereas the primer material of the present invention needs no agitation under most circumstances, thereby obviating the need for such ancillary equipment.

Other advantages of the present invention over zinc-rich type primers of the prior art will become apparent from the following detailed description of the present invention, and it is a general object of this invention to provide a new and improved corrosion resistant primer which embodies all those features and advantages that have herebefore been stated and which will hereinafter become apparent.

PERTINENT PRIOR ART

The following patents were noted in conducting a preliminary patentability investigation on the concepts of the present invention, which patents, while being pertinent to the subject matter hereof, are not believed to negate the patentability hereof:

| Patent No. | Inventor | Issued |
|---|---|---|
| 1,364,134 | G. S. Morgan | 1/04/21 |
| 2,726,308 | L. Cinamon | 12/06/55 |
| 2,970,204 | J. G. Piceu et al | 1/31/61 |
| 3,313,635 | R. F. Wollek et al | 4/11/67 |
| 3,325,432 | M. D. Kellert et al | 6/13/67 |
| 3,380,836 | H. J. Robinson | 4/30/68 |
| 3,446,770 | N. E. King, Jr. | 5/27/69 |
| 3,634,109 | B. F. Mago | 1/11/72 |
| 3,649,307 | A. Oken | 3/14/72 |
| 3,660,119 | A. Oken | 5/02/72 |
| 3,726,694 | F. W. Moore et al | 4/10/73 |
| 3,796,582 | M. J. Leahey et al | 3/12/74 |

DESCRIPTION OF THE PREFERRED EMBODIMENTS

Generally speaking, the corrosion resistant primer material of the present invention consists of a long oil alkyd base material, a factory liquid comprising a paraffinic oil, asbestos fibers, pigmentation materials, an anti-corrosive material consisting of calcium oxide, a wetting agent which is compatible with the calcium oxide, such as petroleum sulfonate, a second factory liquid which acts as an epoxy curing agent, an epoxy resin, another wetting agent which also serves as a phosphate resistant element, and a suitable viscosity controller.

The basic function of the aforesaid composition of the provide for a weldable, corrosion preventative primer that is resistant to mill oil and drawing compounds and which is not subjected to any loss in properties under the influence of the phosphating systems used in modern automobile manufacturing plants.

Any suitable long oil alkyd will be found to be satisfactory, and in certain instances, a short or medium oil alkyd may be used in order to vary the drying properties of the composition. The alkyd functions generally as a binding agent and adds to the weldability of the composition. The alkyd also acts as a film former and enhances the corrosion resistant properties of the composition by resisting attack by the phosphate cleaning operations utilized therewith.

Any suitable paraffinic oil (factory liquid) may be utilized which has the proper viscosity. Such oil also serves in a phosphate resistant capacity and adds to the weldability of the composition. This paraffinic oil, or factory liquid, may consist of 60% by weight "Sunpar 2280" and 40% by weight "Piccopale 100-SF" and may be formulated by heating the oil up to approximately 230° F. and when at that temperature, adding the "Piccopale" thereto.

Any suitable size asbestos fibers may be utilized, with the fiber size being consistent with the type of application and the desired film thickness.

The pigmentation material functions in providing film integrity and providing a suitable color for the composition. Typically, the pigmentation material consists of a combination of red iron oxide and a basic lead silica chromate. A particle size in the general range of Pfiner, Inc. NR-4284 is satisfactory for the red iron oxide. The following alternative materials all of which are made by National Lead Chemicals Div., may be substituted for the basic lead silica chromate in satisfactory use of the composition of the present invention:

1. ONCOR M 50 (anti-corrosive pigment)
2. NALZIN CR-42 (zinc sulfo oxide complex)
3. NALZIN SC-1 (zinc phospho oxide complex)
4. HALOX CW-221 (calcium borosilicate composite pigment)
5. MOLY-WHITE 101 (basic zinc molybdate compound)
6. BUSAN - 11 -M1 (modified barium metaborate pigment)

The pigment is also intended to enhance the anti-corrosion properties of the composition and act as reinforcement or strengthening agent for the film provided thereby, i.e., provide a certain degree of "hiding" power.

The purpose of the calcium oxide is to enhance the corrosion resistant properties and any suitable fine particle calcium oxide has been found to the satisfactory.

Likewise, the function of the wetting agent is to provide the desired anti-corrosion properties and any suitable oil soluble petroleum sulfonate will operate satisfactorily in this capacity.

The second factory liquid may typically consist of boron trifluoride monoethylene complex, and may be formulated by taking diethylene glycol and heating it to 200° F. Thereafter, the monoethylene complex is stirred into the diethylene glycol until the mixture is homogeneous, whereupon the mixture is cooled to 100° F. and added to the overall composition, as will hereinafter be described. This factory liquid is fundamentally a curing agent for the epoxy resin utilized in the composition.

The epoxy resin may typically consist of 4,4' isopropylenediphenolepichlorohydrin resin and functions to enhance corrosion resistance and provide the desired film properties, i.e., anti-slip, sag and slide properties.

The second wetting agent preferably consists of Duomeen-T and is intended to enhance the phosphate resistance of the composition. Finally, the viscosity control agent is preferably in the form of mineral spirits which is used as a thinner to vary the viscosity of the composition.

The following examples illustrate the invention:

| Example No. 1: | % |
|---|---|
| A. Long Oil Alkyd | 29.90 |
| B. Factory Liquid (I) | 15.00 |
| C. Asbestos Fibers | 3.00 |
| D. Pigment | |
| (a) Red Iron Oxide | 1.50 |
| (b) Lead Silica Chromate | 14.90 |
| E. Calcium Oxide | 1.50 |
| F. Wetting Agent (I) | .20 |
| G. Factory Liquid (II) | .24 |
| H. Epoxy Resin | 4.56 |
| I. Wetting Agent | 14.90 |
| J. Mineral Spirits | 14.30 |
| | 100% |

In formulating the corrosion resistant primer material of Example 1, ingredients A and B are initially mixed or blended together in a suitable mixing apparatus for a period of approximately 5 minutes. Thereafter, the ingredients C, D and E are added to the mixture and the entire composition is mixed until homogeneous and lump-free. Ingredients F, G and H are thereafter added to the composition and the entire composition is mixed for an additional approximately 5 minutes period. The wetting agent ingredient I is next added to the composition and the entire composition is mixed for an additional ten minutes, and finally, ingredient J is added to the composition and the entire composition is mixed for a period of time until it reaches a smooth, i.e., lump-free, consistency.

| Example No. 2: | % |
|---|---|
| A. Long Oil Alkyd | 25.70 |
| B. Factory Liquid (I) | 26.28 |
| C. Sunpar 2280 Oil | 12.58 |
| D. Asbestos Fibers | 3.14 |
| E. Afton Clay | 4.18 |
| F. Red Iron Oxide | 7.38 |
| G. Miss. Lime | 2.09 |
| H. Epoxy Resin | 5.00 |
| I. Curing Agent | |
| (borontrifluoride complex) | .10 |
| J. Diethylene Glycol | .10 |
| K. Petronate CR | .52 |
| L. Duomeen - T | 1.03 |
| M. Mineral Spirits | 11.90 |
| | 100% |

In formulating the composition of Example 2, ingredients A, B, and C are added in their respective order to a suitable mixing apparatus and fixed for 10 minutes or until a thoroughly homogeneous mixture is achieved. Thereafter, ingredients D, E, F and G are added in their respective order to the composition and mixed for an additional 15 minutes. Ingredients I and J should be premixed as previously described herein and added with ingredient H to the composition and the entire composition should be mixed for an additional 5 minutes. Ingredients K and L should be added in their respective order to the composition and the entire composition should then be mixed for an additional 10 minutes, it being noted that ingredient L should be a temperature low enough to enable pouring into the composition. Finally, ingredient M should be added to the composition, and the entire composition should be mixed for approximately 30 minutes.

| Example No. 3: | % |
|---|---|
| A. Long Oil Alkyd | 29.90 |
| B. Factory Liquid (I) | 29.90 |
| C. Asbestos Fibers | 3.00 |
| D. Pigment | |

| Example No. 3: | % |
|---|---|
| (a) Red iron oxide | 1.50 |
| (b) Oncor M-50 | 14.90 |
| E. Calcium Oxide | 1.50 |
| F. Wetting Agent (I) | |
| (Nitro chemical petronate CR) | .20 |
| G. Curing Agent (II) | |
| (borontrifluoride complex) | .24 |
| H. Epoxy Resin | 4.56 |
| I. Mineral Spirits | 14.30 |
| | 100% |

In formulating the composition of Example 3, ingredients A and B are initially blended together for a period of 5 minutes. Thereafter, ingredients C, D and E are added to the composition and mixed for an additional 5 minute period of time or until the entire composition is homogeneous and lump-free. Next, ingredient F is added, and the entire composition is mixed for another 5 minute period. Ingredient G is then added to the mixture and the entire composition is mixed for an additional 5 minute period. Thereafter, ingredient H is added to the composition and the entire composition is mixed for an additional 5 minute period, and finally, ingredient I is added slowly to the mixture and the entire composition is mixed until it reaches a smooth consistency. It is to be noted that the factory liquid (I) consists of the same factory liquid described hereinabove and consists of "Sunpar 2280" oil and "Piccopale 100-SF" mixed in the same 60-40 relationship described above.

| Example No. 4: | % |
|---|---|
| A. Medium Oil Alkyd | 47.62 |
| B. Factory Liquid | 26.19 |
| C. Asbestos Fibers | 3.14 |
| D. Pigment | |
| (a) Red iron oxide | 16.19 |
| E. Miss. Lime | 1.90 |
| F. Epoxy Resin | 4.37 |
| G. Curing Agent (I) | |
| (borontrifluoride complex) | .10 |
| H. Diethylene Glycol | .10 |
| I. Wetting Agent (II) | |
| (petronate CR.) | .39 |
| | 100% |

The composition of Example 4 is formulated by mixing ingredients A and B for an initial period of 10 minutes. Thereafter, ingredients C, D and E are slowly added to the composition and mixed for an additional 10 minute period. Thereafter, ingredients F, G, and H are added to the composition in their respective order and the entire composition is mixed for an additional 10 minutes. Thereafter, ingredient I is heated to approximately 100° F. and then added slowly to the composition and the entire composition is mixed for an additional 30 minute period.

The factory liquid embodied in the composition of Example 4 consists of a DIDP plasticizer (54.54% by weight) and "Piccopale 100-SF" (45.46% by weight). The plasticizer is heated to approximately 230° and when it reaches this temperature, the "Piccopale" is slowly added to it.

| Example No. 5: | % |
|---|---|
| A. Long Oil Alkyd | 29.90 |
| B. Factory Liquid (I) | 15.00 |
| C. Asbestos Fibers | 3.00 |
| D. Red Iron Oxide | 16.40 |
| E. Calcium Oxide | 1.50 |

-continued

| Example No. 5: | % |
| --- | --- |
| F. Petronate CR. | .20 |
| G. Curing Agent (borontrifluoride complex) | .24 |
| H. Epoxy Resin | 4.56 |
| I. Factory Liquid | 14.90 |
| J. Mineral Spirits | 14.30 |
| | 100% |

The composition of Example 5 is formulated by adding ingredients A and B within a suitable mixing apparatus and mixing together for a period of 5 minutes. Thereafter, ingredients C, D and E are added to the composition and the entire composition is mixed for an additional 5 minute period. Next, ingredients F, G and H are added to the mixture and the entire composition is mixed for an additional 5 minute period of time. Thereafter, ingredient I (which consists of the same factory liquid as ingredient B) is added to the composition and the entire composition is mixed for an additional 10 minute period of time. Finally, ingredient J is added to the composition and the entire composition is mixed until it reaches a smooth consistency. The factory liquid utilized as ingredients B and I consists of the same composition of "Sunpar 2280" oil and "Piccopale 100-SF" oil as described hereinabove.

| Example No. 6: | % |
| --- | --- |
| A. Long Oil Alkyd | 25.43 |
| B. Factory Liquid | 26.03 |
| C. Sunpar 2280 Oil | 12.46 |
| D. Asbestos Fibers | 3.11 |
| E. Pigmentation | |
| (a) Red iron oxide | 7.27 |
| (b) Halox CW-221 | 4.14 |
| F. Miss. Lime | 2.07 |
| G. Epoxy Resin | 5.00 |
| H. Curing Agent (borontrifluoride complex) | .10 |
| I. Diethylene Glycol | .10 |
| J. Petronate CR. | .52 |
| K. Duomeen - T | 1.02 |
| L. Mineral Spirits | 12.75 |
| | 100% |

In formulating the composition of Example 6, ingredients A, B and C are mixed in their respective order for a period of approximately 10 minutes. Thereafter, ingredients D, E and F are slowly added to the mixture and the entire composition is mixed for an additional 10 minute period of time. Ingredients G, H and I are added to the mixture and the composition is mixed for an additional 5 minute period of time. Ingredients J and K are then added in their respective order and the entire composition is mixed for another 5 minute period of time, and finally, the ingredient L is slowly added to the mixture until the entire composition reaches a smooth consistency, i.e., for a mixing period of approximately 30 minutes. The factor liquid of ingredient B consists of the same composition as the factory liquid as discussed above in connection with Example 5 and previously defined herein.

It is to be noted that when red iron oxide pigment is utilized in the composition of the present invention, the resultant color thereof will be a dark red or orange color; furthermore, it will be appreciated to those skilled in the art that if a different color is desired, for example black, a black iron oxide may be substituted for the red iron oxide. As previously mentioned, the drying time of the composition may be varied by controlling the particular type of alkyd utilized; that is, by changing from a long oil to a medium oil or short oil alkyd, the drying time will be changed accordingly. Additionally, it is to be noted that a suitable epoxy ester may be substituted for the alkyd, whereby to render the composition better resistant to salt spray and to further control the drying time thereof, depending upon the particular appliication in which the composition is to be used.

The corrosion resistant primer material of the present invention is intended to find particularly useful, although it is not so limited, to airless spraying operations of the type well known in the art. One particularly important feature of the present invention resides in the fact that such airless drying equipment need not be cleaned with a suitable solvent material nearly as frequently as is required with conventional zinc-rich primer compositions. An additional feature of the present invention resides in the fact that the corrosion resistant primer material thereof is highly resistant to mill oils and drawing compounds utilized in the automotive industries. Still another feature of the present invention resides in the fact that the primer material of the present invention is highly resistant to the phosphating processes utilized in the automotive industries preparatory to painting the automobile components which have been previously coated with the primer. Additionally, because of the high flash point of the composition, no burn-through areas occur at weld locations, thereby assuring against any stress concentrations which might produce subsequent areas of corrosion. Moreover, because the drying time of the composition may be selectively controlled, the weldability, or welding time, may be accordingly varied, depending upon assembly procedures. In other words, the drying time of the composition can be varied so as to render the welding time left open for up to approximately three weeks without the welding operation adversely affecting the corrosion resistance provided by the primer material once the welding operations occur. Accordingly, the primer material of the present invention will find universality of application, as compared to prior art primer materials, and in particular, as compared to the widely-known and used zinc-rich type primer material.

The material designated by the trademark DUOMEEN comprises N-alkyl trimethylenediamines. This trademark is owned by Armour Industrial Chemical Company, Box 1805, Chicago, Ill. 60690. The material designated by the trademark is owned by the Sun Oil Company, 1608 Walnut Street, Philadelphia, Pa. 19103. The material designated by the trademark PICCOPALE comprises a thermoplastic hydrocarbon resin. This trademark is owned by the Pennsylvania Industrial Chemical Corportation, 131 State Street, Clairton, Pa. 15025.

While it will be apparent that the embodiments illustrated herein are all intended to fulfill the objects above stated, it will be appreciated that the present invention is susceptible to modification, variation and change without departing from the scope of the invention:

I claim:

1. A weldable, corrosion preventative primer material comprising:
    a binding agent and drying time control agent selected from the group consisting of long oil alkyds, medium oil alkyds, short oil alkyds and epoxy esters;
    between 15 and 39% by weight of a paraffinic oil;

between 7.2 and 16.4% by weight of pigment comprising iron oxide;
between 1.5 and 2.09% by weight of calcium oxide;
between 0.20 and 0.24% by weight of a composition of diethylene glycol and boron trifluoride;
an epoxy resin; and
a viscosity control agent.

2. The primer material of claim 1 which further comprises a filler material.

3. The primer material of claim 2 wherein said filler material is a fibrous material.

4. The primer material of claim 3 wherein said fibrous material is asbestos.

5. The primer material of claim 1 which further comprises between 1.03 and 14.90% by weight of N-alkyl trimethylenediamines.

6. The primer material of claim 1 which further comprises between 0.20 and 0.52% of a wetting agent comprising petroleum sulfonate.

7. The primer material of claim 1 wherein said pigment comprising iron oxide comprises red iron oxide.

8. The primer material of claim 1 wherein said pigment comprising iron oxide comprises black iron oxide.

9. The primer material of claim 1 wherein said pigment comprising iron oxide also comprises basic lead silicate.

10. The primer material of claim 1 wherein said epoxy resin comprises 4,4-isopropylenediphenolepichlorophydrin resin.

11. The primer material of claim 1 wherein said viscosity control agent comprises mineral spirits.

* * * * *

UNITED STATES PATENT AND TRADEMARK OFFICE
CERTIFICATE OF CORRECTION

PATENT NO. : 4,049,600
DATED : September 20, 1977
INVENTOR(S) : Kanti D. Patel

It is certified that error appears in the above-identified patent and that said Letters Patent are hereby corrected as shown below:

Column 3, line 56, "of the" (second occurrence) should be --is to--. Column 4, line 20, "Pfiner" should be --Pfizer--; line 43, "the" should be --be--; and lines 62-63, "Duomeen-T" should be --"Duomeen-T"--. Column 6, Example No. 3 (F), "Nitro" should be --Witco--. Column 8, line 48, after "trademark" insert --SUNPAR comprises a paraffinic oil. This trademark--. Column 10, lines 12-13 (Claim 10), "4,4-isopropylenediphenolepichlorophydrin" should be --4,4-isopropylenediphenolepichlorohydrin--.

Signed and Sealed this

Sixteenth Day of May 1978

[SEAL]

Attest:

RUTH C. MASON
Attesting Officer

LUTRELLE F. PARKER
Acting Commissioner of Patents and Trademarks